United States Patent
Amidon et al.

(10) Patent No.: US 8,326,270 B2
(45) Date of Patent: Dec. 4, 2012

(54) OPTIMIZING OPERATION OF A RADIO PROGRAM

(75) Inventors: Christopher M. Amidon, Apex, NC (US); Alfredo C. Issa, Apex, NC (US); Richard J. Walsh, Raleigh, NC (US); Juan A. Pons, Pitsboro, NC (US); Gregory M. Evans, Raleigh, NC (US)

(73) Assignee: Lemi Technology, LLC, Wilmington, DE (US)

( * ) Notice: Subject to any disclaimer, the term of this patent is extended or adjusted under 35 U.S.C. 154(b) by 534 days.

(21) Appl. No.: 12/549,097

(22) Filed: Aug. 27, 2009

(65) Prior Publication Data

US 2012/0040604 A1    Feb. 16, 2012

Related U.S. Application Data

(60) Provisional application No. 61/149,212, filed on Feb. 2, 2009.

(51) Int. Cl.
*H04L 12/58* (2006.01)

(52) U.S. Cl. .................. 455/412.1; 455/3.05; 455/3.06; 455/414.1; 705/14.5

(58) Field of Classification Search .............. 455/3.05, 455/418, 185.1, 3.02, 414.2, 13.1, 3.2, 2, 455/226.4, 31.1, 226.3, 132, 140, 150.1, 455/142, 554, 414, 424, 557, 566, 3.06, 412.1, 455/414.1; 370/389, 487, 393; 709/231, 709/232, 203, 219, 205, 206, 204; 715/716; 704/500, 10, 9; 706/52; 705/347, 14.5
See application file for complete search history.

(56) References Cited

U.S. PATENT DOCUMENTS

| | | | |
|---|---|---|---|
| 3,291,919 A | | 12/1966 | Robitaille |
| 5,189,630 A | | 2/1993 | Barstow et al. |
| 5,732,216 A | * | 3/1998 | Logan et al. ................ 709/203 |
| 5,839,050 A | * | 11/1998 | Baehr et al. ................ 455/2.01 |
| 5,905,865 A | * | 5/1999 | Palmer et al. ............... 725/112 |
| 6,249,810 B1 | | 6/2001 | Kiraly |
| 6,396,549 B1 | | 5/2002 | Weber |
| 6,581,103 B1 | * | 6/2003 | Dengler ........................ 709/231 |
| 6,609,096 B1 | | 8/2003 | De Bonet et al. |
| 6,721,403 B1 | * | 4/2004 | Mandalia ................. 379/101.01 |
| 2001/0028662 A1 | | 10/2001 | Hunt et al. |
| 2002/0023130 A1 | * | 2/2002 | Stettner ....................... 709/205 |
| 2002/0099555 A1 | * | 7/2002 | Pitman et al. ................ 704/500 |

(Continued)

FOREIGN PATENT DOCUMENTS

WO   2008/104034 A1   9/2008

OTHER PUBLICATIONS

"Free Internet Radio in Your Pocket," Jan. 16, 2008, at <http://blogs.consumerreports.org/electronics/2008/01/free-internet-r.html>, copyright 2004-2008, Consumers Union of U.S., Inc., 2 pages.

(Continued)

*Primary Examiner* — Tan Trinh

(57) ABSTRACT

Exemplary embodiments provide for optimizing operation of a radio program, wherein the radio program is operated by a host using a host process. Aspects include collecting and storing contextual information from participants of the radio program, the participants including listeners and callers of the radio program; analyzing the contextual information; and enabling at least one feature on the host process based at least in part on the contextual information.

28 Claims, 8 Drawing Sheets

U.S. PATENT DOCUMENTS

| | | | |
|---|---|---|---|
| 2002/0178441 A1 | 11/2002 | Hashimoto | |
| 2003/0229900 A1* | 12/2003 | Reisman | 725/87 |
| 2004/0031058 A1* | 2/2004 | Reisman | 725/112 |
| 2006/0171395 A1* | 8/2006 | Deshpande | 370/393 |
| 2006/0287915 A1 | 12/2006 | Boulet et al. | |
| 2007/0107008 A1 | 5/2007 | Dybus | |
| 2007/0199017 A1 | 8/2007 | Cozen et al. | |
| 2008/0117933 A1 | 5/2008 | Castiglione et al. | |
| 2008/0147741 A1 | 6/2008 | Gonen et al. | |
| 2008/0155616 A1* | 6/2008 | Logan et al. | 725/93 |
| 2009/0055195 A1* | 2/2009 | Karlsgodt | 704/500 |
| 2009/0055249 A1* | 2/2009 | Lieberman | 705/10 |
| 2009/0061763 A1* | 3/2009 | Dillon et al. | 455/3.05 |
| 2009/0240647 A1* | 9/2009 | Green et al. | 706/52 |
| 2009/0247096 A1* | 10/2009 | Walley et al. | 455/142 |
| 2009/0265163 A1* | 10/2009 | Li et al. | 704/10 |
| 2010/0124892 A1 | 5/2010 | Issa et al. | |
| 2012/0046936 A1 | 2/2012 | Kandekar et al. | |
| 2012/0066038 A1 | 3/2012 | Issa et al. | |

OTHER PUBLICATIONS

"SpacialAudio Solutions, LLC—SAM Broadcaster—Internet Radio Automation Software," at <http://www.spacialaudio.com/?page=sam-broadcaster&tab=tab-sam-broadcaster-overview> found on the Internet Archive on Jul. 25, 2008, copyright 2007-2008, Spacial Audio Solutions, LLC, 3 pages.

"Audience Response Systems, Inc.," at <http://www.audienceresponse.com/> found on the Internet Archive, copyright 2007, Audience Response Systems, Inc., 2 pages.

"Digital On-Air Studio System," Jan. 31, 1994, Copyright format only 1997, Knight-Ridder Info., 1 page.

Eisenstadt, M. et al., "KMi Stadium: Web-based Audio/Visual Interaction As Reusable Organisational Expertise," dated Sep. 1996, Workshop on Knowledge Media for Improving Organisational Expertise, 1st International Conference on Practical Aspects of Knowledge Management, Oct. 30-31, 1996, Basel, Switzerland, KMI-TR-31, available at <http://kmi.open.ac.uk/kmi-abstracts/kmi-tr-31-abstract.html>, 12 pages.

"Innovision Incorporated—Audience Response Technology," at <http://www.innovisioninc.com/audience-response.php> found on the Internet Archive, copyright 2008, Innovision Incorporated, 4 pages.

Liu, Jingjing et al., Abstract, "Web-Based Aggregated Platform for user-contributed interactive media broadcasting", Proceedings of the 15th International Multimedia Conference, Sep. 23-28, 2007, Augsburg, Bavaria, Germany, pp. 541-544, ACM, New York, 3 pages.

McConnell, Chris, "The tapeless revolution comes to radio (disk-based radio broadcasting storage, production and editing systems)," Broadcasting & Cable, v124, n41, p. 77, Oct. 10, 1994, Copyright 1995, Info Access Co., 4 pages.

McGookin, Steve, "The Joy of Text," Forbes.com, Apr. 27, 2006, at <http://www.forbes.com/2006/04/26/mcgookin-column-text-messaging-cx_sm_0427texting_print.html>, printed Dec. 12, 2011, 2 pages.

"RCS Acquires Decision Inc.; Offers Complete Software Solution for Radio Station Programming Operations," Businesswire, Feb. 9, 1993, Copyright 1995, Reuters Info. Svcs., 2 pages.

"RDNS03 Potential applications and use cases," v0.6, Sep. 29, 2008, at <http://radiodns.org/wp-content/uploads/2009/03/rdns031.pdf>, RadioDNS, 5 pages.

Sterling, S. Revi et al., "AIR: Advancement through Interactive Radio," CU Technical Report CU-CS-1006-06, Sep. 2007, 12 pages.

"Ubiqus—Transcription, Translation, Interpretation, Audience Response Systems," at <http://www.ubiqus.com/index.php?Lang=GB&argRedirect=GBIAUDIENCE-RESPONSE-SYSTEM&gclid=CMrD421oZUCFQyenAodyVzJig>, date unknown, printed Dec. 12, 2011, 2 pages.

Weller, Mary, "Radio Station Software: Programmes That Meet Your Stations Needs," Music & Media, Nov. 28, 1992, p. 11, Copyright 1995, Information Access Co., 3 pages.

Zinman, Aaron et al., "RadioActive: enabling mobile-based audio forums," Workshop CHI 2005, Apr. 3-4, 2005, Portland, Oregon, at <http://citeseerx.ist.psu.edu/viewdoc/download?doi=10.1.1.116.9747&rep=rep1&type=pdf>, 2 pages.

* cited by examiner

OPTIMIZING OPERATION OF A RADIO PROGRAM

CROSS-REFERENCE TO RELATED APPLICATIONS

This application claims the benefit of provisional Patent Application Ser. No. 61/149,212, filed Feb. 2, 2009, assigned to the assignee of the present application, and incorporated herein by reference.

BACKGROUND

With the popularity of MP3 type music players and smart mobile phones, talk radio programming for both terrestrial and Internet radio is expected to grow as an alternative to current levels of music content and associated royalties. Specifically, with Internet radio, small listener audience talk radio is beginning to emerge, allowing low-cost entry of hosted talk radio shows into the market that have a long tail of small audience programming.

Software applications are available today for use by Internet radio hosts that control core streaming capabilities of the Internet radio station and optimize music playback. Such conventional applications are sufficient to enable a host to manage the music program or station, but are inadequate for the host of an Internet talk radio program. Rather than merely managing a playlist of music, the host of an Internet talk radio program must manually perform many tasks in parallel. An example of critical tasks the host must perform may include managing a queue of callers, and at the same time, determining what topics to discuss during the talk radio program. Each task may include subtasks. For example, managing the caller queue may involve everything from screening calls to determining which calls to take next, to knowing when to end or extend a call. For terrestrial talk radio hosts, there is typically a staff of people helping to manage these activities. However, for the "long tail" type of Internet talk radio programs described here, the host is typically on his or her own—consequently, there is a need to optimize as much as these functions as possible.

BRIEF SUMMARY

The exemplary embodiment provides methods and systems for optimizing operation of a radio program, where the radio program is operated by a host using a host application. Aspects of the exemplary embodiment include collecting and storing contextual information from participants of the radio program, the participants including listeners and callers of the radio program; analyzing the contextual information; and enabling at least one feature on the host application based at least in part on the contextual information.

In one embodiment, the host application may enable one or more the following features all based on the collected contextual information: manage the optimized caller queue, automatically generate a topic suggestion, and present an audience engagement indicator. In one embodiment, functions of managing the caller queue may further include prioritizing the caller queue, automating the caller queue, and soliciting callers.

DETAILED DESCRIPTION

The exemplary embodiment relates to optimizing the operation of a radio program. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments.

The embodiments will be described with respect to systems and/or devices having certain components. However, the systems and/or devices may include more or less components than those shown, and variations in the arrangement and type of the components may be made without departing from the scope of the invention. For example, preferred embodiments may be described in terms of Internet radio and an Internet talk radio program, but the methods and systems disclosed are equally applicable to terrestrial radio. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide methods and systems for utilizing contextual information collected from participants to optimize operation of an Internet talk radio program. The contextual information collected may include one or more of location, calling history/comments, topic interests, current caller ratings, level of engagement, user environment, other user presence information, topic interests, calling history, and current caller ratings and the like. Once such dynamic contextual information about the listeners is gathered and processed by the system, several features may be enabled or enhanced on an Internet host application operated by the host of the Internet radio program. Some of the features that may be enabled include optimizing a caller queue, making topic suggestions, and providing audience engagement indicators, for example.

Figure 1:
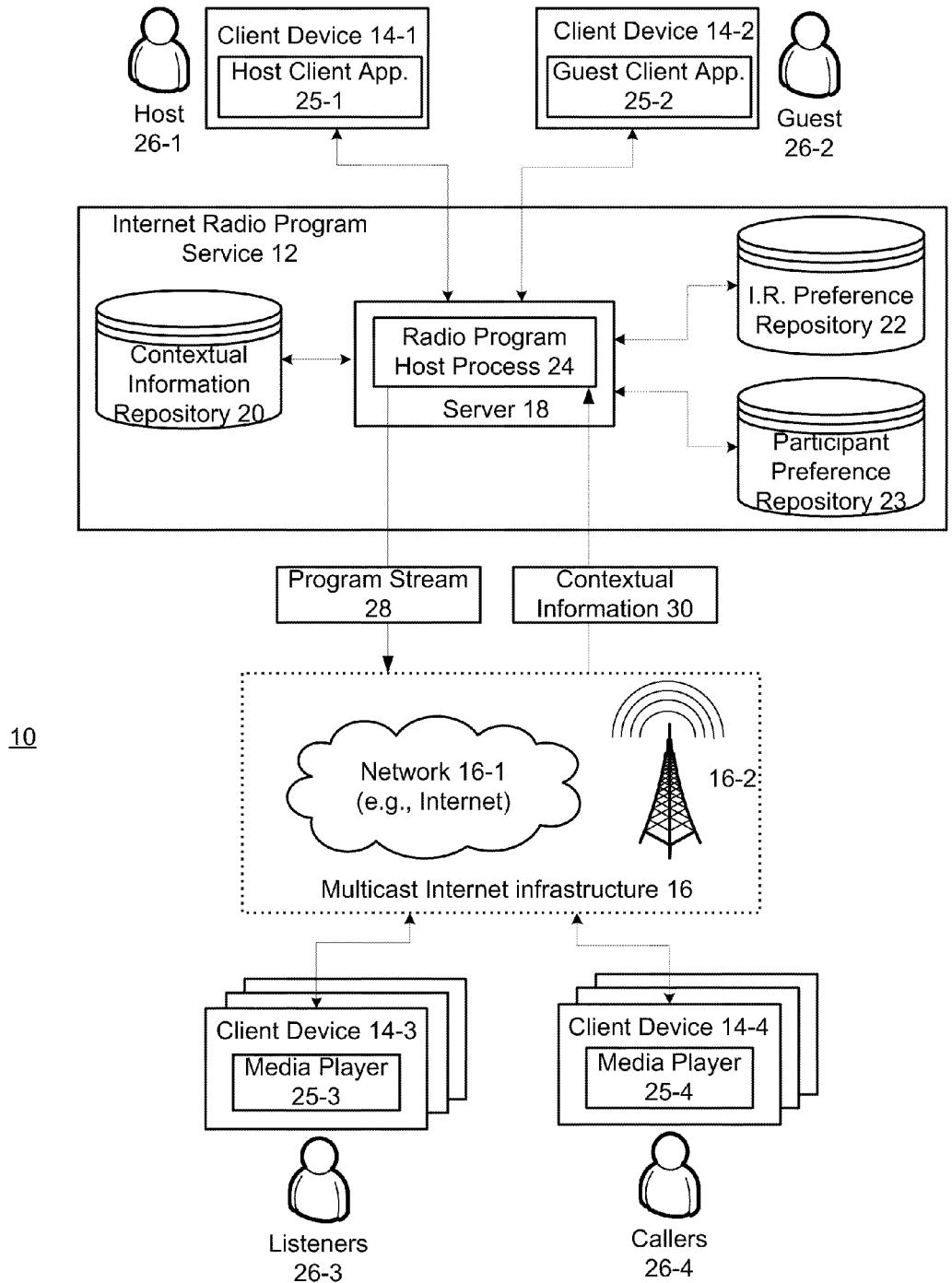
FIG. 1 is a diagram illustrating a system for optimizing operation of an Internet talk radio program.

FIG. 1 is a diagram illustrating a system for optimizing operation of an Internet talk radio program. The system 10 includes an Internet radio program service 12 that may communicate with any a number of client devices 14-1, 14-2, 14-3 and 14-4 (collectively client devices 14). The Internet radio program service 12 may broadcast a program stream 28 for each radio station of the Internet radio program service 12 through a multicast Internet infrastructure 16. In an alternative embodiment, the system 10 may include a terrestrial radio program service that transmits radio programs over the air.

The Internet radio program service 12 may include a server 18, a contextual information repository 20, an internet radio (IR) preference repository 22, and participant preference repository 23. According to the exemplary embodiment, the server 18 executes a radio program host process 24 that may provide centralized management function for the Internet radio program service 12. In another embodiment, the radio program host process 24 may also provide core connectivity functions by, for example, controlling the broadcast of the program stream 28. In a further embodiment, the radio program host process 24 may also provide advertising, accounting, and billing services to allow monetization of microfranchise Internet radio programs.

In one embodiment, the radio program host process 24 interacts with different types of participants who participate via the client devices 14 in Internet radio programs being streamed and/or transmitted. In one embodiment, the different types of Internet radio programs participants may be involved in include both talk radio programs as well as music programs that both allow listeners to call in.

According to one embodiment, the different types of participants involved in the talk radio program being streamed may include a radio program host 26-1, an optional guest 26-2, listeners 26-3 and callers 26-4. The host 26-1 is a person who speaks on-air during broadcasting of the Internet radio program, and who may also control the Internet radio program by for example, introducing guests, topics, callers and timing of advertisements, for instance. The host 26-1 may also refer to one or more staff members or employees of an Internet radio station. The optional guest 26-2 is a guest speaker on the talk radio program. The listeners 26-3 are users of the Internet radio program service 12 who are currently listening to the program stream 28. The callers may be a subset of listeners 26-3 that have called into the Internet talk radio program by phone or by Internet chat/e-mail to comment on topics under discussion, ask questions of a host/guest, and the like.

In one embodiment, the term participants 26 may be used to refer collectively to audience members comprising the listeners 26-3 and the callers 26-4, collectively. In another embodiment, the term participants 26 may be used to refer collectively to the listeners 26-2, the callers 26-3, the host 26-1 and/or the guest, 26-2.

In one embodiment, each of the client devices 14 comprises different types of electronic devices such as a computer or a smart phone, for example. Other examples may include a communication-equipped MP3 player, a personal digital assistant (PDA), a set-top box, or game system, for instance. The multicast Internet infrastructure 16 may provide communication between the server 18 and at least a portion of the client devices 14-3 and 14-4 over a wired or wireless interface to a network 16-1, such as the Internet, or over a wireless communication network 16-2, such as a 3G or 4G network (WiMAX or LTE), for example. In another embodiment, a unicast structure may be used to provide communication between the server 18 and a portion of the client devices 14.

In one embodiment, the client devices 14 may execute a client application that interacts with the radio program host process 24. In FIG. 1, the client device 14-1 of the host 26-1 executes a host client application 25-1, and the client device 14-2 of the guest 26-2 executes a guest client application 25-2. The host and guest client applications 25-1 and 25-2 may be configured to interact with the radio program host application 24 and to allow the host 26-1 and the guest 26-2 to speak and control certain aspects of the Internet radio program. In one embodiment, the host 26-1, the client device 14-1, the guest 26-2 and the client device 14-2 may be located remotely from the radio program service 12. For example, the host 26-1 and the guest 26-2 may be employed at a radio station, while the radio program service 12 is provided by a third party. In another embodiment, the host 26-1, the client device 14-1, the guest 26-2 and the client device 14-2 may be located within the radio program service 12, as when the radio program service 12 is run internally at a radio station, for example.

The client devices 14-3 and 14-4 of the listeners 26-3 and callers 26-4, respectively, may execute client applications in the form of media players 25-3 and 25-4. The media players 25-3 and 25-4 may be configured to subscribe to the program stream 28 and play digital audio content, such as for listening to the radio programs broadcast by the Internet radio program service 12. The media players 25-3 and 25-4 may also be configured to interact with the host client applications 25-1, the guest client applications 25-2 and/or the host and guest client applications 25-1 and 25-2. The host client application 25-1, the guest client application 25-2, and the media players 25-3 and 25-4 are collectively referred to herein as client applications 25.

In an alternative embodiment, the participants 26 may participate in the talk radio programs via a browser (not shown), such as web browser, executing on the client device 14, rather than the client applications 25. In another embodiment, the client applications 25 may be implemented as a browser plug-in.

According to the exemplary embodiment, the client applications 25 continually collect contextual information 30 from the participants 26 that the radio program host process 24 uses to enable and/or automate functions of the Internet radio program based on an analysis of the contextual information 30. In the embodiment shown, the contextual information 30 is collected primarily from the the listeners 26-3 and the callers 26-4. However, in another embodiment, the contextual information 30 may also be collected from the guest 26-2 and even the host 26-1. The contextual information 30 may be stored in the contextual information repository 20. Preferences of the Internet radio station/program and/or of the host 26-1 may be stored in an Internet radio preferences repository 22.

In one embodiment, the participants may be queried during or shortly after an account set up process for participant preferences, such as topic interests and the like, described further below. These user preferences may be stored in a participant preference repository 23.

Figure 2:
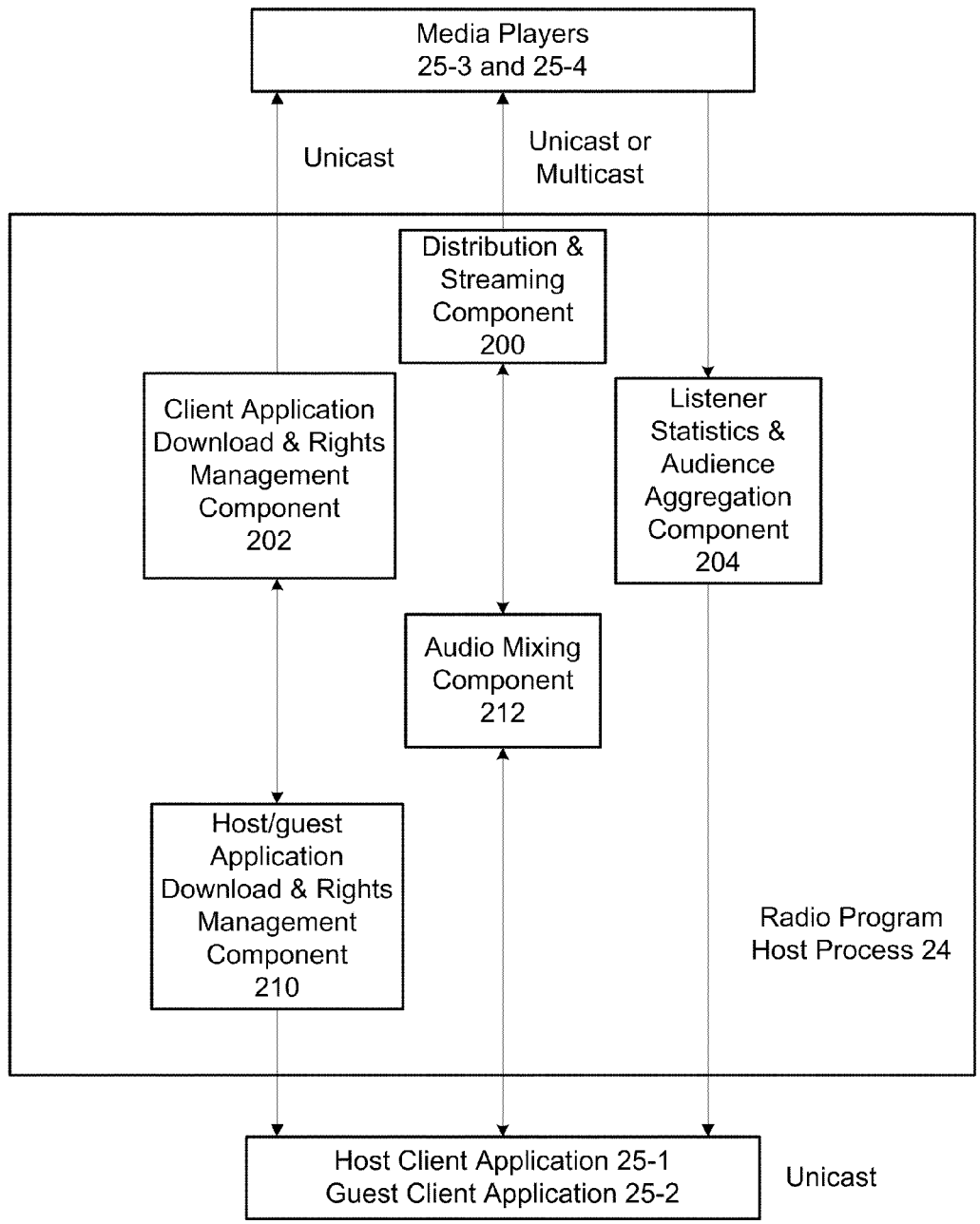
FIG. 2 is a diagram illustrating components of the radio program host application in accordance with one embodiment.

FIG. 2 is a diagram illustrating components of the radio program host process 24 in accordance with one embodiment. The radio program host process 24 may include one or more of a distribution and streaming component 200, a client application download and rights management component 202, a listener statistics and audience aggregation component 204, a network management component 206, a per show account management component 208 a host/guest application download and rights management component 210, and an audio mixing component 212.

The client application download and rights management 202 may be responsible for downloading the client applications 25-3 and 25-4 to the client devices 14-3 and 14-4 and for managing license rights to the client applications 25-3 and 25-4. The host/guest application download and rights management component 210 may be responsible for downloading the host client application 25-1 to the host client device 14-1 and for downloading the guest application 14-2 to the guest client device 14-2.

Although the host client device 14-1 and the guest client device 14-2 are shown in FIG. 1 in proximity to the server 18 and may be coupled to the server via a local area network (LAN), it should be understood that the host client device 14-1 and the guest client device 14-2 may be located remotely from the server 18 and coupled to the server 18 via the multicast Internet infrastructure 16. In an alternative embodiment not shown, the host 26-1 or guest 26-2 may interact with the radio program host process 24 directly via the server 18 or a console coupled to the server 18, where the functionality of the host and guest client applications 25-1 and 25-2 are incorporated into the radio program host process 24.

The distribution and streaming component 200 and the audio mixing component 212 provide the real time production and broadcast for the Internet radio programs. The distribution and streaming component 200 may be responsible for broadcasting the program stream 28 from one or more Internet radio stations. In one embodiment, the program stream 28 may be provided to the client devices 14 via a multicast distribution tailored for the access network, i.e., UDP using an industry standard protocol stack. Interfaces to the host application 25-1 and the guest application 25-2 may be a unicast reliable transport protocol such as TCP/IP. The audio mixing component 212 may provide program production facilities for mixing audio from the host 26-1 with program material and/or audio from the guest 26-2. Standard features for the audio mixing component 212 may be controllable via the radio program host process 24. Other options may include call-in audio mixing from listeners. Additionally, the audio mixing component 212 may produce podcasts to be made available post show time. For back-up, pre-recorded podcasts by the host 26-1 could be used to override the existing program when technical difficulties occur with communication to host and/or guest applications.

The listener statistics and audience aggregation component 204 may receive contextual information 30 from the client application 25-1 in the form of listener statistics, which may be used as both a feedback mechanism to the host 26-1 via the host application 25-1 and optionally the guest application 25-2, as explained further below. The listener statistics and audience aggregation component 204 may also serve as a mechanism of revenue generation for tracking advertisement value.

Client application download and usage rights management may be used where special features related to the Internet talk radio program are employed at the client devices 14. However, in the exemplary embodiment, the client applications 25 are downloaded once by each of the participants 26 and usage rights managements may be preconfigured within the client applications 25. Features may be enabled/disabled based on the particular program, context of the participants, etc. In addition to normal internet radio functions, additional features may include, but not be limited to, the following:

Secure access to encrypted stream
Call-in feature & chat features
Usage tracking/reporting for royalty calculations
Narrowcast and late bind ad insertion tracking and reporting
Listener presence/profile data collection and reporting
Location tracking and reporting of playback device Some capabilities of the above features may be directly obtainable via application program interfaces (APIs) to other applications within the client devices 14.

In another embodiment, the host application 25-1 and the guest application 25-2 may be downloaded and managed under digital rights management (DRM) control to only be activated during show time. Alternately, a web browser or thin client type application could be used where host and guest login prior to show time. This login method may also be employed on a thick client as well. In either scenario the server 18 may be responsible for authenticating login of host 26-1 and guest 26-2.

The client applications 25 may be implemented in software, hardware, or a combination of hardware and software. Both the server 18 and the client devices 14 may include hardware components of typical computing devices (not shown), including a processor, input devices (e.g., keyboard, pointing device, microphone for voice commands, buttons, touchscreen, etc.), output devices (e.g., a display device, speakers, and the like). The server 18 and client devices 14 may include computer-readable media, e.g., memory and storage devices (e.g., flash memory, hard drive, optical disk drive, magnetic disk drive, and the like) containing computer instructions that implement the functionality disclosed when executed by the processor. The server 18 and the client devices 14 may further include wired or wireless network communication interfaces for communication.

Although the server 18 is shown as a single computer, it should be understood that the functions of server 18 may be distributed over more than one server, and the functionality of software components may be implemented using a different number of software components. For example, the radio program host process 24 may be implemented as more than one component. In an alternative embodiment (not shown), the server 18 and the radio program host process 24 of FIG. 1 may be implemented as a virtual entity whose functions are distributed over multiple client devices 14.

Figure 3:
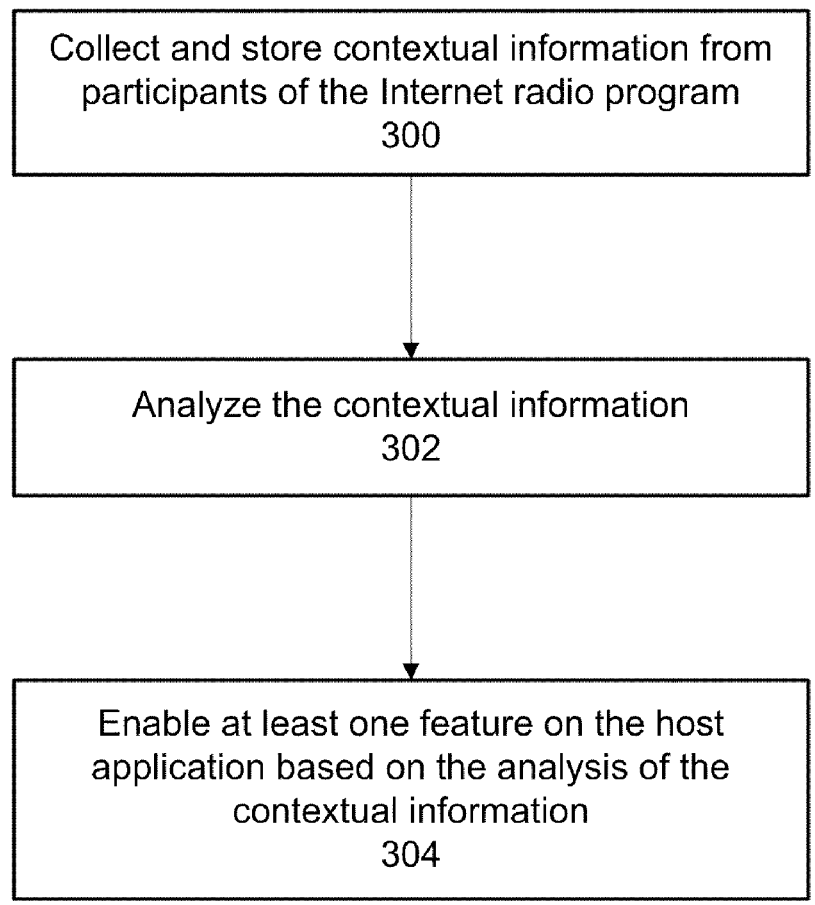
FIG. 3 is a flow diagram illustrating a process for optimizing operation of Internet radio program.

FIG. 3 is a flow diagram illustrating a process for optimizing operation of a radio program, which may be performed by a combination of the radio program host process 24 and the client applications 25. In one embodiment, the radio program comprises an Internet radio program, and more particularly, an Internet talk radio program. In another embodiment, the radio program may comprise a terrestrial radio program.

The process may include collecting and storing the contextual information 30 from participants of the Internet radio program (block 300). In one embodiment, the contextual information 30 collected may be stored in the contextual information repository 20. Alternatively, the contextual information may be stored in memory. In one embodiment, the participants from which the contextual information 30 is collected includes the listeners 26-3 and callers 26-4. In another embodiment, the participants from which the contextual information 30 is collected may also include the guest 26-2 and/or the host 26-1.

In one embodiment, the contextual information 30 is continually collected during the Internet radio program by the radio program host process 24 via the client applications 25. As such, the contextual information 30 is collected from current participants 26 of the Internet radio program. However, the contextual information 30 may also be collected from past participants of the radio program in an embodiment where the contextual information 30 for the past participants is retained in the contextual information repository 20. Additionally, the contextual information may be collected for scheduled participants 26 prior to the beginning of the show.

In one embodiment, the contextual information 30 collected from the participants 26 comprises different types of listener information including location, user environment, proximity to other people, user presence information, client computer data including software application activity, topic interests, calling history, current caller ratings, and the like. The location type of information may be collected in the form of global positioning system (GPS) data, cell tower triangulation data, an Internet protocol (IP) address, a zip code, or an address, for example. From the location information, the proximity to other people/participants/locations may be determined. Additionally, based on user's proximity to other participants, the user's location may be determined. Examples of environment type of information may include whether the participant 26; is at work or home, is stationary or moving, is in a noisy or crowed environment, and the like. The types of client computer data that may be collected 10 include the manufacturer of the client device and processing capabilities, the make and version of available Internet browsers and other applications, the type of operating system (e.g., PC or Mac), and the like.

Information regarding the software application activity may include activity detected within the client application 25 or activity in other applications executing on the client device 14. For example, detected activities within the client application 25 and/or in other applications may include chat activity, participant's access to additional content within the client application 25, the participant's ratings of callers, the minimizing/closing of the client application, and idle activity. Additionally, the participant's activity in other applications and processes on the client device 14 may be collected. From the detected level of software application activity, the user's level of engagement can be estimated as described below. The contextual information 30 collected by the radio program host process 24 via the client applications 25 may be collected automatically or by querying the participants 26 for input.

The topic interests, calling history, and current caller ratings may pertain to statistics gathered for the listener 14-3 in association with the Internet radio program service 12. Topic interest may be a listing of topics the listener would like the host 26-1 to discuss. The calling history may be a history of the listener's calls into one or more radio programs. And the current caller ratings may be ratings given to the listener 14-3 by other listeners bases on the listener's call into the radio program or online comments made by the listener 14-3.

In a further embodiment, the system 10 may define varying levels of contextual information that is to be collected and utilized by the host 26-1. For privacy reasons, the types of contextual information 30 collected from the participants 26 may be user configurable so that each of the participants 26 is able to select from varying levels of privacy in terms of what type of information is or is not collected by the system 10. In one embodiment, access to more detailed contextual information 30 may require a fee to be paid to the participants 26.

Additionally, the level or type of contextual information 30 collected and utilized may be determined dynamically based on a number of parameters. For example, in the case of a popular Internet radio program, only high-level contextual information 30 may be collected, while in the case of a niche show that has only a small number of users, more contextual information 30 may be collected. As other examples, the level or type of contextual information 30 collected may be based on the genre of the program, topics in the program, day/time, and the like.

As one example of how the participants' contextual information 30 is gathered, aggregated and distributed, the system 10 may use standardized methods of accessing contextual, or "presence", data. For example, XML-based XMPP or Extensible Messaging and Presence Protocol may be utilized. When a user signs into the system 10, the client application 25 may begin collecting any related contextual information 30 based on the users preferences for contextual data that may be stored in the participant preferences repository 23. The data collection may also be limited or enabled by the users' devices and applications. The client application 25 sends the data collected to the server 18, and upon receiving the data, the server 18 may store the collected contextual information 30 in the contextual information repository 20.

Referring still to FIG. 3, the collected contextual information 30 is analyzed (block 302). In one embodiment, the analysis includes comparing the contextual information 30 to selected criteria including Internet radio preferences from the Internet radio preference repository 22 and/or participant preferences from the participant preference repository 23. The selected criteria may be selected manually by the host 26-1, by both the host 26-1 and the guest 26-2, or automatically by the radio program host process 24. The analysis may also include comparing the contextual information 30 of different participants 26. Examples of the type of analysis that may be performed include, but are not limited to, the following:

calculating audience statistics, including the number of listeners 26-3 and the number of callers 26-4 in real time;

determining ratings of the callers 26-4 based on criteria including the caller's preferences in the participant preference repository 23, such as for example rating callers 26-4 based on how closely the caller's participant topic preferences match a current topic of discussion;

performing demographic analysis based on the location data, environment data, and client devices of the participants 26;

determining each participant's proximity to other participants 26 based on collected location data; and calculating audience engagement level based on collected software application activity from some or all of the participants 26.

In one embodiment, the radio program host process 24 performs the analysis. In another embodiment, the client application 25 may be configured to perform some or all of the analysis.

After the contextual information 30 is analyzed, at least one feature is enabled on the radio program host process 24 based at least in part on the contextual information 30 (block 304). In one embodiment, the enabled feature may include presenting to the host 26-1 of the Internet radio program the results of the analysis and/or the contextual information 30. The results of the analysis and/or the contextual information 30 may be presented by display via a user interface, by voice, or by print. The host 26-1 may make a request for the data through the host client application 25-1. The host 26-1 may submit a request for the contextual information 30 of current and/or previous participants 26 of the Internet radio program. Once the radio program host process 24 receives the request from the host client application 25-1, the radio program host process 24 may then retrieve and present the information based on the host's current level of access to the data. For example, statistics generated from the contextual information 30 of the participants 26 may be displayed to the host 26-1, or the names and locations of the listeners 26-3 and/or the callers 26-4 may be presented.

In one exemplary embodiment, other features may be enabled include one or more of managing an optimized caller queue, automatically generating a topic suggestion, and presenting an audience engagement indicator. Each of these three concurrent processes is described in further detail in FIGS. 4 through 8.

Figure 4:
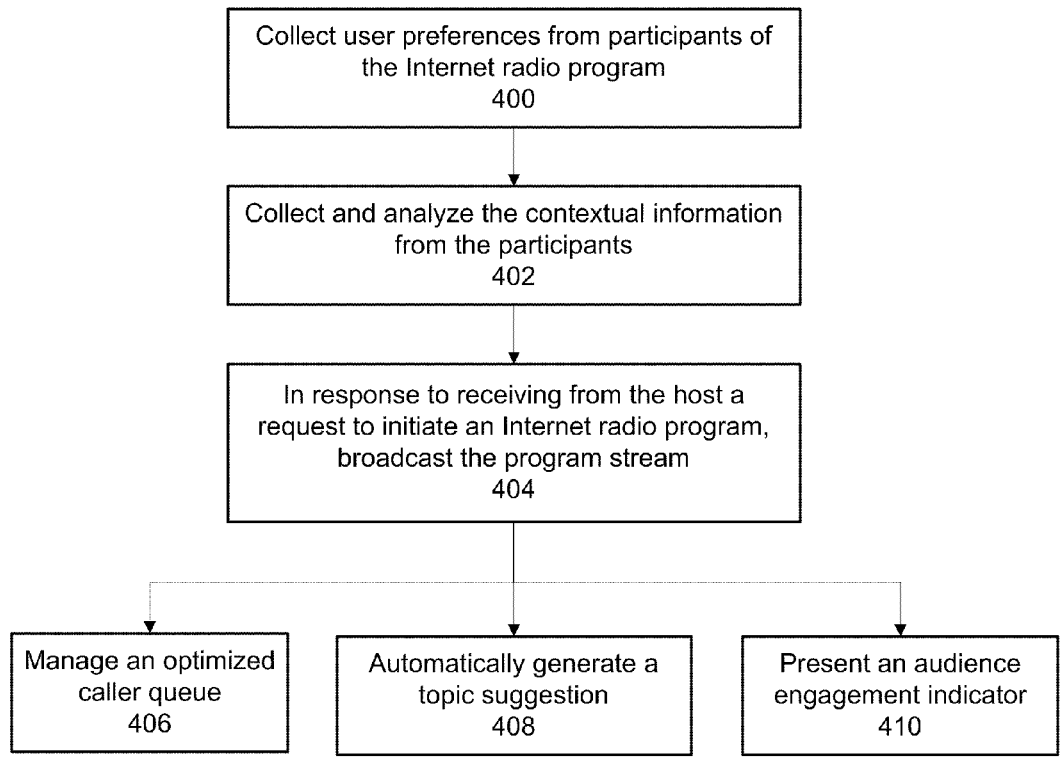
FIG. 4 is a high-level flow diagram illustrating the overall process for optimizing an Internet radio program in further detail.

FIG. 4 is a high-level flow diagram illustrating the overall process for optimizing Internet radio program in further detail. The process may include collecting user preferences from the participants 26 (block 400). In one embodiment, the participant preferences may be collected by the client application 25. In another embodiment, the participant preferences may be collected by the radio program host process 24 (e.g., when participants 26 interact with the Internet radio program service 12 via a browser) The user preferences collected may include contact information, preferred listening time, Internet radio stations and programs of interest, topics of interest, and the like. The user preferences may be collected from participants 26 during streaming/transmission of the Internet radio program or upon account creation, for example. The user preferences may be stored in the participant preference repository 23 as user profiles, for example.

Internet radio preferences may also be collected, which may include preferences of the Internet radio program service 12, preferences for each of the Internet radio stations, preferences for each Internet radio programs, and/or preferences of the host(s) 26-1 and optionally the guest(s) 26-2. The Internet radio preferences stored in the Internet radio preference repository 22 may include threshold values for analyzing caller ratings, for determining caller queue priority, for determining software activity level, and for determining suggested topics of discussion, for example. The Internet radio preferences may also include static information, such as call screening questions that may be asked of potential callers.

The contextual information 30 is collected from the participants 26 and analyzed (block 402). In one embodiment, the contextual information 30 may be collected and analyzed by the client applications 25, by the radio program host process 24, or a combination of both. For example, in one exemplary embodiment, the contextual information 30 may be collected by the client applications 25 and analyzed by the radio program host process 24. In one embodiment, the contextual information 30 is continuously collected during the radio program from the participants 26, but may be collected prior to the radio program as well from potential or scheduled participants.

In response to receiving from the host 26-1 a request to initiate an Internet radio program, the radio program host process 24 begins broadcasting the program stream 28 corresponding to the Internet radio program (block 404).

Next, the radio program host process 24 is configured to enable one or more of the following processes: manage an optimized caller queue 406, automatically generate a topic suggestion 408, and present an audience engagement indicator 410, each of which is based at least in part on the contextual information 30 collected. In one embodiment, these process features may run concurrently and continually during the broadcasting of the program stream 28. In other words, the host process features may run in the background, even if they are not currently needed. For example, the process feature of "manage the caller queue" may run whether or not there are actually any callers 14-4. Which set of process features are enabled may be controllable manually by the host 26-1 or automatically via the Internet radio preferences.

Figure 5:
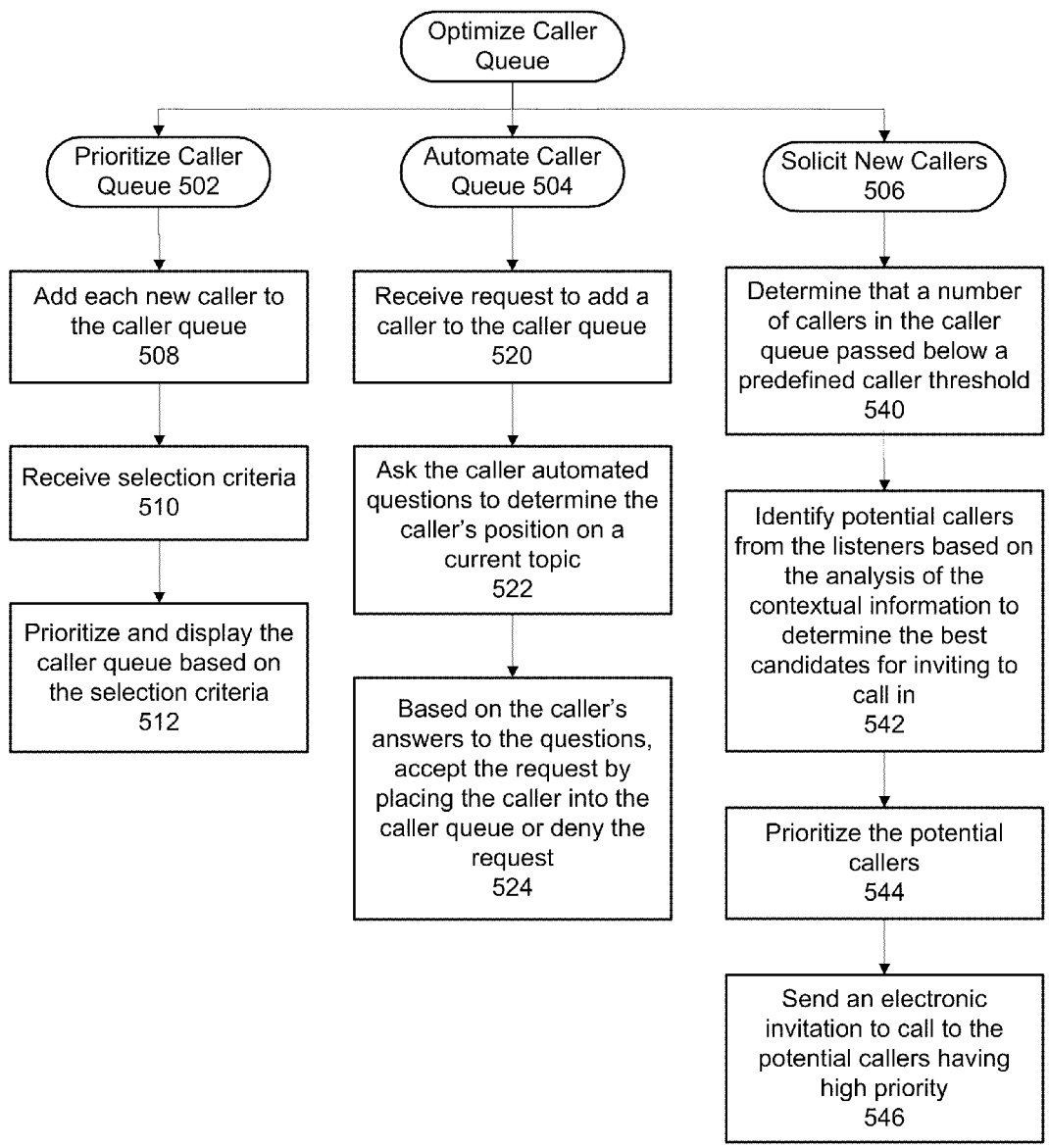
FIG. 5 is a flow diagram illustrating the process of managing the optimized caller queue corresponding to block 406 in FIG. 4.

FIG. 5 is a flow diagram illustrating the process of managing the optimized caller queue corresponding to block 406 in FIG. 4. In one exemplary embodiment, the process of managing an optimized the caller queue 500 includes one or more of sub-processes configured to: prioritize the caller queue 502, automate the caller queue 504, and automatically solicit new callers 506, which involves adding at least a portion of the solicited callers to the caller queue.

In one embodiment, the process of prioritizing the caller queue 502 may include adding each new caller 26-4 that calls-in to the Internet radio program to a caller queue (block 508). In response receiving selection criteria (block 510), the radio program host process 24 prioritizes and displays the caller queue based on the selected criteria (block 512).

In one embodiment, the selected criteria may include any of: each of the caller's context match to the audience; each of the caller's context match to the selected criteria; and caller ratings. The caller's context match to selected criteria may be determined by matching the caller's contextual information with the selection criteria.

For example, the caller's context match to the audience may be based on determining a degree of match between each of the caller's contextual information 30 and the contextual information of the listeners 26-3. As an example of the caller's context match to the audience, assume that based on the contextual information 30 collected from the participants 26, the system 10 determines that most of the listeners 26-3 are in cars and listening on iPhones. The caller queue could be prioritized based selecting the iPhones listeners as the selection criteria, resulting in those callers 26-4 being moved to the top of the caller queue.

As another example, if the selected criteria is a current topic, then a match between the caller and the current topic can be determined by accessing the caller's preferred topics from either the user preferences or from input from the caller 26-4, and comparing the caller's preferred topics with the current topic.

The caller queue may also be prioritized based on caller ratings. In a further embodiment, the caller rating may be determined by community-based influences. In this embodiment, radio program host process 24 may receive ratings of callers, and prioritizes the caller queue based on the ratings. Each caller may be rated from a variety of sources in the community, such as ratings or votes entered by current listeners 26-3, ratings from the host 26-1 and/or the guest 26-2, and/or ratings from all users of the Internet radio program service 12.

In one embodiment, participants 26 may have the ability to influence priority of the caller queue by applying a rating of "thumbs up" or "thumbs down" to the callers in the queue or by selecting a number of rating stars. This system 10 also provides for the current callers or the entire audience to communicate amongst themselves to help prioritize and optimize the caller queue. For example, often times on a talk show a listener 26-3 may think "the previous caller stole my thunder". By displaying the caller queue to all participants along with a reason of why each caller 26-4 is calling, several community-based optimizations to the caller queue can be performed. For example;

Callers will see that other callers (ahead of them in the queue) are going to discuss the same thing, where the lower priority caller would simply drop off the queue.

Using standard chatting or voice communications a listener 26-3 may contact a caller 26-4 in the queue and answer his question for him. Basically, keeping the "newbies" from wasting air time.

A caller 26-4 low in the queue could send a message to a caller 26-4 higher in the queue with a related point—and ask—"could you also mention "the bailout and health care when you ask your question". And then, that caller would drop off the queue.

Audience members may be chatting amongst themselves after looking the caller queue and say something like—"nobody's getting to the real point, can someone ask him about the bailout and health care?"

Audience members, when looking at the caller queue, may notice that a caller way down in the list has a great question. In response, they may encourage each other to "bump that caller up" and they all give the caller a higher rating/priority and the caller is moved up in the queue.

The caller, seeing other calls in the queue ahead of him may want to adjust his reason for calling in an attempt to move higher in the queue.

Figure 6:
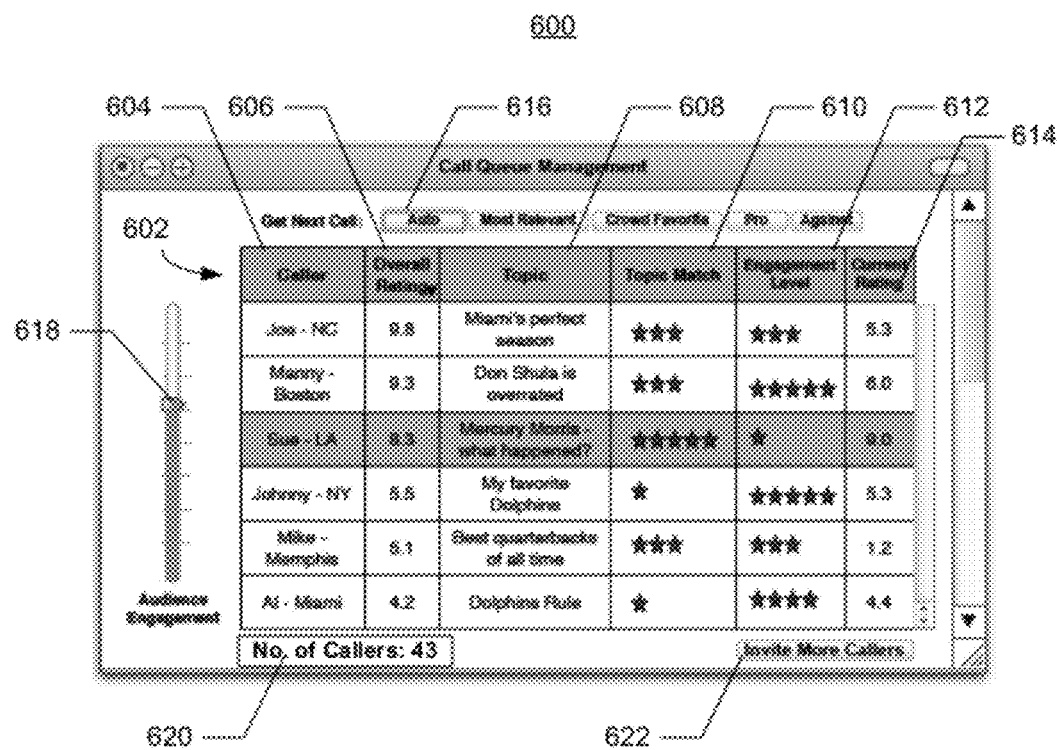
FIG. 6 is a block diagram illustrating an exemplary call queue management interface that may be displayed to the host for managing the caller queue.

FIG. 6 is a block diagram illustrating an exemplary call queue management interface that may be displayed to the host 26-1 for managing the caller queue. The call queue management interface 600 may display the caller queue 602 in a table format where each entry includes a caller identity 604 and parameters associated with the caller that may include the caller's location (shown with the caller ID 604), an overall rating 606 for the caller, a topic 608 the caller wishes to discuss, a topic match 610 indicating a score of how well the topic matches the host's current topic, an engagement level 612 of the caller, and a current rating 614 indicating a rating for the caller by current listeners and/or past listeners.

Using the caller queue management interface 600, the host 26-1 is able to view additional information about the callers in the caller queue 602 and may select the next caller based on a number of different selection criteria for prioritizing the caller queue. In one embodiment, the host 26-1 may choose which selection criteria are used for prioritizing the caller queue by clicking on a column heading corresponding selection criteria or by clicking one of several types of "Get Next Call" buttons.

The host 26-1 can choose whether to manually choose the selection criteria or whether an automated selection will be made. In this embodiment, the radio program host process 24 may be configured to automatically retrieve the selection criteria from the Internet radio preferences and/or the user preferences, and then prioritize the caller queue 602. In this example, the host may activate the automated selection by clicking an "Auto" button 616 next to "Get Next Call," causing the radio program host process 24 to utilize predefined rules for automatically selecting next call. Assuming that the host's preferences for selection criteria include the best topic match 610 and best current rating 614, then automated selection selects caller "Sue from LA" who has the highest topic match 610 and the highest current rating 614.

This example also depicts the caller queue management interface 600 may also present an indication to the host 26-1 of the overall engagement level of the audience, shown in this example as an audience engagement indicator 618. The audience engagement indicator 618 may be determined by averaging the engagement levels 612 of each of the callers 26-4 and/or the listeners 26-3. The caller queue management interface 600 may also be configured to display a total number of callers 620 currently in the caller queue 602.

Referring again to FIG. 5, the process of optimizing the caller queue 500 may further include a process for automating the caller queue 504. The radio program host process 24 may include several automations to assist the host 26-1 in the management of the caller queue 602. In one embodiment, the process of automating the caller queue 504 may include receiving a request to add a caller 26-4 to the caller queue 602 (block 520). In response, the caller 26-4 is asked automated questions to determine the caller's position on a current topic (block 522).

According to the exemplary embodiment, the radio program host process 24 may receive a selection from the host 26-1 of either automated call screening or community-based call screening. In automated call screening, the radio program host process 24 presents the caller 26-4 with the automated questions (e.g., via voice prompts or by electronic text). In community-based call screening, the radio program host process 24 passes the caller to one or more listeners acting as call screeners who present questions to the caller 26-4. The questions may be; similar to the automatically generated questions, questions created prior to the show, or questions that the listener creates, and the like. Also, a first call listener may forward the caller to additional listeners to provide the call screening. The choice of selecting automated call screening or community-based call screening may be set in the host's preference or selected from the caller queue management interface 600.

Based on the caller's answers to the questions, the radio program host process 24 either accepts the request by placing the caller into the caller queue 602 or denies the request (block 524). In community-based call screening where the caller is passed to multiple call screeners, the radio program host process 24 may sum acceptances and denials from the call screeners and may determine to place the caller in the caller queue 602 if the total of the acceptances passes a predetermined threshold, such as being greater than some percentage over the call screener's denials.

Referring still to FIG. 5, the process of optimizing the caller queue 500 may further include soliciting new callers 506. In this embodiment the radio program host process 24 may proactively solicit callers to the radio program on behalf of the host 26-1. The radio program host process 24 may determine that a number of callers in the caller queue has passed below a predefined caller threshold (block 540). For example, the caller queue 602 may be empty or low and the host 26-1 prefers having the callers 26-4 speak rather than filling-in time him or herself.

The radio program host process 24 can actively solicit callers 26-4 by identifying potential callers 26-4 from the listeners 26-3 based on the analysis of the contextual information 30 to determine the best candidates for inviting to call in (block 542). In one embodiment, the contextual information 30 used to identify the potential callers may comprise one or more of: an engagement level history with the Internet radio program (including a current engagement level) by the potential caller, a degree to which an expertise of the potential caller matches a current topic, the potential caller's client device capabilities, and the caller rating of the potential caller. For example, the radio program host process 24 can be configured to favor users that have been listening for some time, have the proper client device 14 to enable them to receive an invitation and to call in, and the like.

The radio program host process 24 may prioritize the identified potential callers (block 506). Prioritizing the callers can be used to find the callers that most closely match the current or future topics for the show (experts). An electronic invitation to call may be then sent to the potential callers having high priority (block 508). The invitation may take the form of a voice or electronic text message/prompt.

Figure 7:
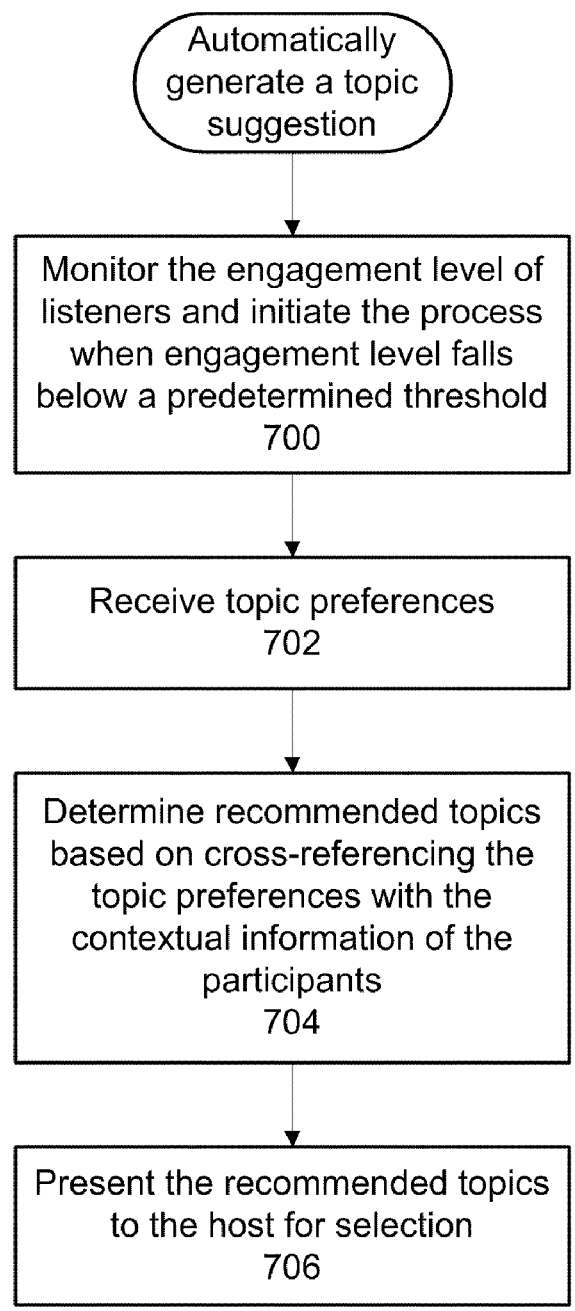
FIG. 7 is a diagram illustrating the process for automatically generating a topic suggestion corresponding to block 408 in FIG. 4.

Referring again to FIG. 4, a second process that may be enabled in the radio program host process 24 based on the contextual information 30 may be to automatically generating a topic suggestion 408, as shown in FIG. 7.

FIG. 7 is a diagram illustrating the process for automatically generating a topic suggestion corresponding to block 408 in FIG. 4. Topics may be a key ingredient for radio talk shows. Topics can be often the reason that listeners 26-3 choose a particular radio station or program. If the topic goes too far be on the interest of the listener 26-3, then the listener 26-3 may be likely to change stations or stop listening. In one embodiment, the radio program host process 24 attempts to keep the topics covered by the Internet radio program relative to the listening audience by the following.

In one embodiment, the process of automatically generating topics may be initiated by monitoring the engagement level of listeners 26-3 and initiating the process of generating topics when the engagement level falls below a predetermined threshold (block 700). The process may be initiated automatically by the radio program host process 24 or manually by the host 26-1. In another embodiment, the process may be initiated when too few callers are in the caller queue.

The radio program host process 24 may then receive topic preferences (block 702). In one embodiment, the radio program host process 24 may receive the topic preferences by manual input of the participants 26, from a topic repository (which could comprise the Internet radio preference repository 22), and/or by monitoring conversations (e.g., chat) among the participants 26. Receiving the topic preferences by manual input of the participants 26 includes presenting an upcoming topics list to the participants 26 via the client applications 25, and receiving votes from the participants 26 of which topics the participants 26 prefer to hear about. This pushes topics that are crowd favorites to the top.

The radio program host process 24 determines recommended topics based on cross-referencing the topic preferences with the contextual information of the participants 26 (block 704). In this case, topics may be associated with various topic preferences such as location, demographics, environment, and the like. The radio program host process 24 may prioritize the topics based on the context of the current audience. For example, suppose the host 26-1 has two possible topics: "flag burning" and the "Confederate flag." If the radio program host process 24 determines from the contextual information 30 that most the listeners 26-3 are located in the South, the radio program host process 24 may recommend Confederate flag topic to the host 26-1. In another embodiment, the recommended topics may be determined based on the topic interests of engaged listeners 26-3 as indicated by the listener's engagement levels.

After determining recommended topics, the radio program host process 24 may present the recommended topics to the host 26-1 for selection (block 706).

Figure 8:
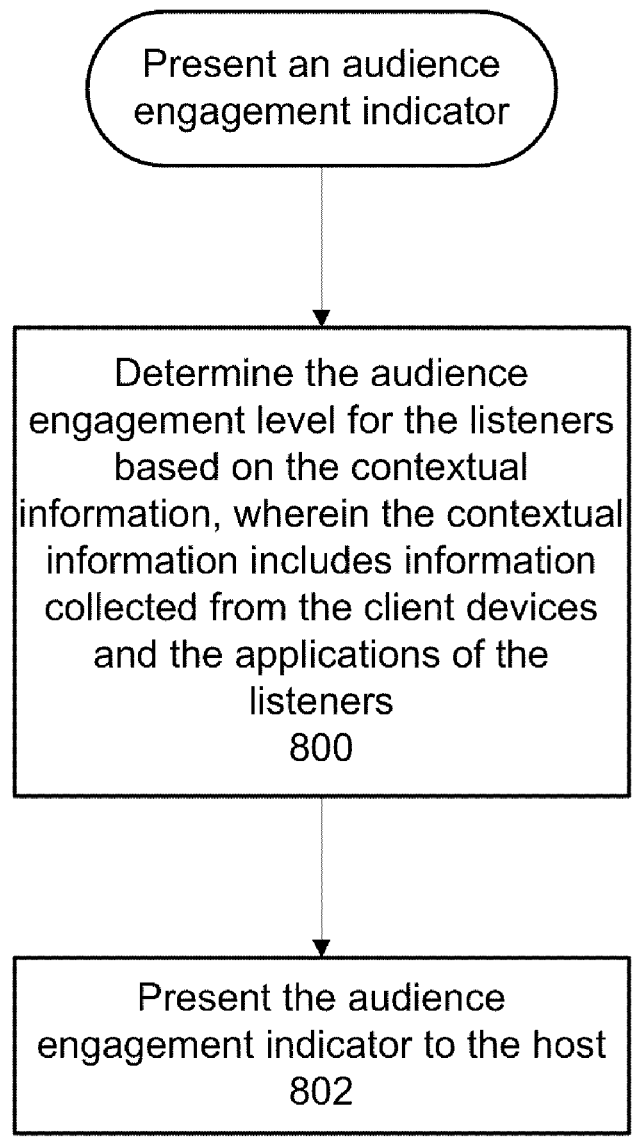
FIG. 8 is a diagram illustrating the process for presenting the audience engagement indicator corresponding to block 410 in FIG. 4.

Referring again to FIG. 4, a third process that may be enabled in the radio program host process 24 based on the contextual information 30 may be to present the audience engagement indicator 410, as shown in FIG. 8.

FIG. 8 is a diagram illustrating the process for presenting the audience engagement indicator 618 corresponding to block 410 in FIG. 4. In traditional talk radio broadcast, the host has little knowledge of how engaged his current audience is. In accordance with the exemplary embodiment, the host 26-1 is provided with a constant and dynamic indication of the engagement level of his audience by presenting the audience engagement indicator 618 (FIG. 6). This engagement level indicator 618 may also be presented to the other participants in the show such as the guest 26-2, callers 26-4 and the listeners 26-3. Additionally, the engagement level indicator 618 for the show may be available in some fashion, such as on a web site, so others, who are not currently participating, may see the audience engagement level 618 for the program.

In one embodiment, the process of presenting the audience engagement indicator 618 may begin by determining the audience engagement level for the listeners 25-3 based on the contextual information 30, wherein the contextual information 30 includes information collected from the client devices 14 and the applications of the listeners 25-3 (block 800). In this embodiment, the system 10 continually collects the contextual information 30 from the participants 26. As described previously, this may include information regarding the activity within the current client application 14, in other applications, and the like.

After audience engagement level has been determined, radio program host process 24 may present the audience engagement indicator 618 to the host (block 802). In one embodiment, the audience engagement indicator 618 is presented by displaying the audience engagement indicator 618 in the caller queue management interface 600. The audience engagement indicator 618 may be presented with graphics, audio, text, and/or in print.

As an example of the process, assume that a particular caller 26-4 strikes a chord with the audience and in response, the listeners begin chatting to each other, calling in, etc. upon detection of this activity among the listeners 25-3, the radio program host process 24 may raise the audience engagement indicator 618. The host 26-1 seeing the rise in the audience engagement indicator 618 may then decide to keep the caller 26-4 longer than normal. This is one example in which the host 26-1 takes action based on the audience engagement indicator 618.

In another embodiment, the radio program host process 24 may automatically initiate an action based on the audience engagement level passing below a predefined engagement threshold. For example, if the engagement level drops a certain percentage, the radio program host process 24 may present a new topic suggestion for the host 26-1.

According to the audience engagement indicator 618 of the exemplary embodiment, the host 26-1 can tell, for example, when a caller talks too long for the current audience and begins losing interest, or dropping off completely. He can also tell, for example, when a caller 26-4 sparks interest in the audience. Additionally, the host 26-1 will know if he has a "new" audience, may be consisting mostly of channel changers just checking out his program, or if he has long-time listeners.

An example use case will now be presented to illustrate further features and embodiments of the process for optimizing an Internet radio program. The use case is as follows:

1. An Internet talk radio show is underway with several callers already in the caller queue.
2. The host switches to a new topic. For example, the host chooses "Remembering 9/11".
3. The host process analyzes the context of the current queue of callers.
4. The host process prioritizes those callers with a location in the vicinity of New York City to the top of the queue. In this step, the caller queue is prioritized based on contextual relevance to the current topic. Specifically, the host process is finding any callers that are in proximity to the "location" of the story.
5. When the host selects "Next Caller", he is presented with a caller from the New York area.
6. The show progresses talking with callers from New York.
7. The audience begins to tire of personal accounts from 9/11 and many become disengaged.
8. The host process recognizes the dwindling audience and lack of engagement activity and begins suggesting other related topics to the host. In this step, based on the continual flow of contextual/presence data, the host process begins selecting other topics to the host that may be of interest to the current listeners.

9. Based on the current audience, the system recommends "9/11 conspiracy theory". Additionally, since the host process detected that most users are at home on their PC, it recommends associated content for the host to push based on this topic—a photo of a suspected small plane near the towers. In this step, the host process recommends additional content to be made available to the listeners due to the fact that the content is relevant to the topic and the host process has determined that most users will be able to see the content.

A method and system for optimizing a radio program has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Accordingly, many modifications may be made by one of ordinary skill in the art without departing from the spirit and scope of the appended claims.

We claim:

1. A method for optimizing operation of a radio program, wherein the radio program is operated by a host using a host process, the method comprising:
   collecting and storing contextual information from participants of the radio program, the participants including listeners and callers of the radio program;
   analyzing the contextual information; and
   enabling at least one feature on the host process based at least in part on the contextual information.

2. The method of claim 1 wherein the contextual information comprises types of participant information including one or more of: location, environment, proximity to other people, user presence information, client computer data including software application activity, topic interests, calling history, and current caller ratings.

3. The method of claim 2 wherein the types of contextual information collected are participant configurable.

4. The method of claim 2 wherein the collecting further comprises continually collecting the contextual information from the participants during the radio program, wherein the participants include at least one of current participants and past participants of the radio program.

5. The method of claim 1 wherein the analyzing further comprises comparing the contextual information to selected criteria including at least one of radio preferences and participant preferences.

6. The method of claim 5 wherein the selected criteria is selected by one of the host, a guest of the host, and automatically by the host process.

7. The method of claim 1 wherein enabling the at least one feature includes presenting to the host of the radio program at least one of results of the analysis and the contextual information.

8. The method of claim 7 wherein enabling the at least one feature includes managing an optimized caller queue.

9. The method of claim 8 further comprising managing the optimized caller queue by at least one of:
   prioritizing the caller queue;
   automating the caller queue; and
   automatically soliciting new callers for the radio program and adding at least a portion of the new callers to the caller queue.

10. The method of claim 9 wherein prioritizing the caller queue further comprises:
    adding each new caller that calls into the radio program to a caller queue;
    receiving selection criteria; and
    prioritizing the caller queue based on the selection criteria.

11. The method of claim 10 wherein the selection criteria includes one or more of:
    each of the caller's context match to an the participants;
    each of the caller's context match to the selected criteria; and
    caller ratings.

12. The method of claim 10 wherein the caller ratings are determined by community-based influences, by:
    receiving ratings of the callers, wherein the ratings are received by one or more of current listeners, the host, and a guest; and
    prioritizing the caller queue based on the ratings of the callers.

13. The method of claim 9 wherein automating the caller queue further comprises performing automatic call screening, including:
    receiving a request to add a caller to the caller queue;
    asking the caller automated questions to determine the caller's position on a current topic; and
    based on the caller's answers to the automated questions, accepting the request by placing the caller into the caller queue or denying the request.

14. The method of claim 13 further comprising receiving a selection from the host of one of an automated call screening and a community-based call screening, wherein in the automated call screening, the host process presents the caller with the automated questions, and in the community-based call screening, the host process passes the caller to one or more of the listeners acting as call screeners who present the automated questions to the caller.

15. The method of claim 9 wherein automatically soliciting the new callers further comprises:
    determining that a number of callers in the caller queue passes below a predefined caller threshold;
    identifying potential callers from the participants based on the analysis of the contextual information;
    prioritizing the potential callers; and
    sending an electronic invitation to call to the potential callers having high priority.

16. The method of claim 15 wherein the contextual information used to identify the potential callers comprises one or more of:
    a history of engagement level with the radio program;
    a degree to which an expertise of a potential caller matches a current topic;
    client device capabilities; and
    caller rating.

17. The method of claim 1 wherein enabling the at least one feature includes automatically generating a topic suggestion.

18. The method of claim 17 wherein automatically generating the topic suggestion comprises:
    receiving topic preferences;
    determining recommended topics based on cross-referencing the topic preferences with the contextual information of the listeners; and
    presenting the recommended topics to the host for selection.

19. The method of claim 18 wherein automatically generating the topic suggestion is initiated in response to monitoring an engagement level of the participants and initiating the generating of the topic suggestion when engagement level falls below a predetermined threshold.

20. The method of claim 18 wherein receiving topic preferences comprises at least one of:
   receiving the topic preferences from manual input of the participants;
   receiving the topic preferences from a topic repository; and
   receiving the topic preferences by monitoring conversations among the participants.

21. The method of claim 18 further comprising initiating generation of the topic suggestion in response to an engagement level indicator passing below a predetermined engagement threshold.

22. The method of claim 1 wherein enabling the at least one feature includes presenting an audience engagement indicator.

23. The method of claim 22 wherein presenting the audience engagement indicator comprises:
   determining an audience engagement level for the listeners based on the contextual information, wherein the contextual information includes information collected from client devices and applications of the listeners; and
   presenting the audience engagement indicator to at least the host.

24. The method of claim 22 further comprising automatically initiating an action based on the engagement level passing a predefined engagement threshold.

25. The method of claim 1 wherein the participants further include at least one of the host and a guest of the host.

26. An executable software product stored on a tangible computer-readable medium containing program instructions for optimizing a radio program, wherein the radio program is operated by a host using a host process, the program instructions for:
   collecting and storing contextual information from participants of the radio program, the participants including listeners and callers of the radio program;
   analyzing the contextual information; and
   enabling at least one feature on the host process based at least in part on the contextual information.

27. A server, comprising:
   a storage device;
   a network interface for receiving contextual information of participants of a radio program, the participants including listeners and callers of the radio program; and
   a processor executing a host process, wherein the host process controls operation of the radio program and wherein the radio program is operated by a host using the host process, and wherein the host process is configured to:
      collect the contextual information of the participants;
      store the contextual information in the storage device;
      analyze the contextual information; and
      enable at least one feature on the host process based at least in part on the contextual information.

28. A system, comprising:
   a plurality of client devices used by participants to participate in a radio program, the participants including listeners and callers of the radio program;
   a server coupled to the plurality of client devices via a network;
   a host process executed by the server for controlling operation of the radio program, wherein the radio program is operated by a host via the host process, and wherein the host process is configured to:
      collect from the client devices the contextual information of the participants;
      analyze the contextual information; and
      enable at least one feature on the host process based at least in part on the contextual information.

* * * * *